(12) United States Patent
Nakanishi et al.

(10) Patent No.: US 8,869,879 B2
(45) Date of Patent: Oct. 28, 2014

(54) PIPE/FILLER UNIT, INTERNAL HEAT EXCHANGING TYPE DISTILLATION COLUMN AND PRODUCTION METHOD THEREOF

(75) Inventors: Toshinari Nakanishi, Amagasaki (JP); Kazumasa Aso, Amagasaki (JP); Kensuke Iuchi, Chiba (JP); Kinpei Horiuchi, Ichihara (JP); Masaru Nakaiwa, Tsukuba (JP)

(73) Assignees: Kimura Chemical Plants Co., Ltd. (JP); National Institute of Advanced Industrial Science and Technology (JP)

( * ) Notice: Subject to any disclaimer, the term of this patent is extended or adjusted under 35 U.S.C. 154(b) by 1627 days.

(21) Appl. No.: 12/375,829

(22) PCT Filed: Feb. 28, 2007

(86) PCT No.: PCT/JP2007/053756
§ 371 (c)(1),
(2), (4) Date: Mar. 9, 2009

(87) PCT Pub. No.: WO2008/015804
PCT Pub. Date: Feb. 7, 2008

(65) Prior Publication Data
US 2009/0260791 A1 Oct. 22, 2009

(30) Foreign Application Priority Data
Jul. 31, 2006 (JP) .................................. 2006-208815

(51) Int. Cl.
| F28D 5/02 | (2006.01) |
| B21D 53/02 | (2006.01) |
| B01D 3/32 | (2006.01) |
| F28D 3/02 | (2006.01) |
| F28F 13/00 | (2006.01) |
| F28D 7/16 | (2006.01) |
| B01D 3/28 | (2006.01) |

(52) U.S. Cl.
CPC .. *F28D 7/16* (2013.01); *F28D 3/02* (2013.01); *F28F 13/003* (2013.01); *F28F 2280/02* (2013.01); *B01D 3/28* (2013.01)
USPC ............. 165/115; 138/161; 202/235; 261/94; 29/890.07

(58) Field of Classification Search
USPC ...................... 202/235, 237; 261/94; 138/161; 165/115; 29/890.03, 890.07
See application file for complete search history.

(56) References Cited

U.S. PATENT DOCUMENTS

| 248,442 | A | * | 10/1881 | Fowler | .......................... | 138/161 |
| 388,260 | A | * | 8/1888 | Carey | ............................ | 138/161 |
| 5,783,047 | A | * | 7/1998 | Aso et al. | ...................... | 202/235 |

FOREIGN PATENT DOCUMENTS

| DE | 1 253 673 | 11/1967 |
| GB | 1004046 | 9/1965 |

(Continued)

OTHER PUBLICATIONS

International Search Report dated Apr. 17, 2007, issued in corresponding international application No. PCT/JP2007/053756.

(Continued)

*Primary Examiner* — Leonard R Leo
(74) *Attorney, Agent, or Firm* — Ostrolenk Faber LLP

(57) ABSTRACT

An inside regular filler layer is disposed inside a pipe where heat is exchanged between an inside and an outside of a pipe wall so as to abut an inner peripheral surface of the pipe, and an outside regular filler layer is disposed outside the pipe so as to surround the pipe and closely contact an outer peripheral surface of the pipe. The outer peripheral surface of the pipe is subjected to close contact-promoting processing in order to enhance close contacting feature between the outer peripheral surface and the outside regular filler layer. The pipe/filler unit is used for the distillation section of an internal heat exchanging type distillation column.

12 Claims, 10 Drawing Sheets

(56) References Cited

FOREIGN PATENT DOCUMENTS

| JP | 11-179102 | 7/1999 |
|---|---|---|
| JP | 2000-189703 | 7/2000 |
| JP | 2000-189705 | 7/2000 |
| JP | 2001-137605 | 5/2001 |
| JP | 2004-016929 | 1/2004 |
| JP | 2004-037017 | 2/2004 |
| JP | 2004-216338 | 8/2004 |

OTHER PUBLICATIONS

German Office Action, dated Apr. 4, 2014, issued in corresponding German Patent Application No. 112007001771.6. Total 11 pages, including English translation.

* cited by examiner

PRIOR ART

PRIOR ART

_US 8,869,879 B2_

PIPE/FILLER UNIT, INTERNAL HEAT EXCHANGING TYPE DISTILLATION COLUMN AND PRODUCTION METHOD THEREOF

CROSS REFERENCE TO RELATED APPLICATIONS

This application is a national stage of International Patent Application No. PCT/JP2007/053756, filed Feb. 28, 2007, and claims the benefit of priority under 35 U.S.C. §119 of Japanese Patent Application No. 2006-208815, filed Jul. 31, 2006, the entire contents of which are incorporated herein by reference.

TECHNICAL FIELD

The present invention relates to a pipe/filler unit that has a structure formed by combining a pipe with a regular filler, an internal heat exchanging type distillation column of a packed column type which is produced using the pipe/filler unit, for example, which is adapted such that a pipe inside and a pipe outside of a single pipe or each pipe are isolated from each other inside the body barrel by connecting the single pipe or a plurality of pipes with a body barrel by both end pipe plates, a difference is caused in operating temperature by causing a difference in operation pressure between the pipe inside and the pipe outside, and heat is exchanged between the low-pressure side and the high-pressure side by transferring heat to the low-pressure side from the high-pressure side, and a production method thereof.

BACKGROUND ART

As a distillation column having an excellent energy-saving property, an internal heat exchanging type distillation column which includes a low-pressure column and a high-pressure column is configured so as to exchange heat between both the columns, and does not require transfer of heat with others is known.

Also, an internal heat exchanging type distillation column which relates to the above internal heat exchanging type distillation column, and is configured such that heat is made to transfer from the high-pressure side inside a pipe which is filled with a regular filler to the low-pressure side inside a pipe which is similarly filled with a regular filler, whereby the high-pressure side inside the pipe functions as an enriching section and the low-pressure side outside the pipe functions as a stripping section is suggested (refer to Patent Document 1).

That is, this internal heat exchanging type distillation column, as shown in FIG. 9, includes a body barrel 51, a plurality of pipes 75 that is inserted into the body barrel 51, and an upper pipe plate 53a and a lower pipe plate 53b that connect the plurality of pipes 75 to the body barrel 51. Also, the internal heat exchanging type distillation column has a structure in which a pipe inside 54 and a pipe outside 55 of each pipe 75 are separated from each other, and is configured such that the pipe inside 54 functions as an enriching section on the high-pressure side, and the pipe outside 55 functions as a stripping section on the low-pressure side.

Additionally, a stripping section liquid inlet 56 for supplying liquid to the pipe outside (stripping section) 55 and a stripping section steam outlet 57 which allows steam from the pipe outside (stripping section) 55 to be extracted therethrough are disposed in an upper portion of the body barrel 51, and an enriching section liquid inlet 58 for supplying liquid to the pipe inside (enriching section) 54 and an enriching section steam outlet 59 which allows the steam from the pipe inside (enriching section) 54 to be extracted therethrough are disposed in an end chamber 64a which communicates with the pipe inside (enriching section) 54 above the upper pipe plate 53a.

On the other hand, a stripping section steam inlet 60 for supplying steam to the pipe outside (stripping section) 55 and a stripping section liquid outlet 61 which allows the liquid from the pipe outside (stripping section) 55 to be extracted therethrough are disposed in a lower portion of the body barrel 51, and an enriching section steam inlet 62 for supplying steam to the pipe inside (enriching section) 54 and an enriching section liquid outlet 63 which allows the liquid from the pipe inside (enriching section) 54 to be extracted therethrough are disposed in an end chamber 64b which communicates with the pipe inside (enriching section) 54 below the lower pipe plate 53b. Additionally, the pipe inside (enriching section) 54 and the pipe outside (stripping section) 55 are filled with fillers (regular filler) 54a and 55a.

Additionally, in this internal heat exchanging type distillation column, as shown in FIG. 10, a plurality of single pipe units 80 having a structure in which the filler layer (regular filler) 55a is disposed so as to surround an outer peripheral surface of the pipe 75, and the filler layer 55a disposed at the outer peripheral surface of the pipe 75 is covered with a partition pipe 65 made of a metallic thin plate are disposed at a predetermined pitch inside the body barrel 51, whereby the pipe inside 54 and the pipe outside 55 of each pipe 75 are isolated from each other inside the body barrel 51, and the filler layer 55a is disposed around each pipe 75.

According to the internal heat exchanging type distillation column of this Patent Document 1, it is possible to realize a high energy-saving property and excellent distillation performance simultaneously.

Meanwhile, in the internal heat exchanging type distillation column configured as described above, cleaning of a distillation section, such as a pipe inside or a pipe outside may be required by continuous operation. In this case, although it is desirable to extract and clean a distillation section composed of the pipe 75, the regular fillers 54a and 55a disposed at the pipe inside 54 and the pipe outside 55, respectively, and the like from the body barrel, it is not necessarily easy to extract the distillation section from the body barrel. Therefore, a method, such as chemical cleaning, which performs cleaning without disassembling an apparatus, is considered. In this case, even when sufficient cleaning cannot be necessarily performed, there is a problem in that replacement or the like of filler cannot be performed, and sufficient performance cannot be recovered.

Meanwhile, in the internal heat exchanging type distillation column, a raw material liquid is supplied to an uppermost portion on the side of a stripping section and the liquid flows down to a lowermost portion of the stripping section, and an enriching section is supplied with steam without any soiling from the stripping section. Therefore, it is a situation in which the degree of soiling is apt to become stronger at the pipe outside 55 on the side of the stripping section than the pipe inside 54 on the side of the enriching section.

Thus, it is suggested that the pipe outside on the side of the stripping section where the degree of soiling is apt to become stronger has a wet wall structure in which cleaning is relatively easy (refer to Patent Document 2).

However, the internal heat exchanging type distillation column has advantages in using a filler for the distillation section. For example, the filler has a large number of theoretical stages per unit height compared to a wet wall or a shelf stage. In a packed column, compared to a wet wall column or a shelf stage column, the height of the column can be designed low, the space of a facility can be reduced, and the cost can be reduced.

Thus, in order to make the internal heat exchanging type distillation column of a packed column type more significant, it is necessary to enable the distillation section to be extracted, and thus to enable performance to be reliably recovered even when the distillation section is soiled.

However, as described above, in the present circumstances, it is a situation in which the distillation section, especially, the filler of the stripping section is not easily extracted.

Patent Document 1: Unexamined Japanese Patent Application, First Publication No. 2004-016929
Patent Document 2: Unexamined Japanese Patent Application, First Publication No. 2004-037017

DISCLOSURE OF INVENTION

Problems to be Solved by the Invention

The present invention was made to solve the above-mentioned problems, and aims at providing a pipe/filler unit including a pipe, and an inside regular filler layer and an outside regular filler layer respectively disposed inside and outside the pipe, and favorably used for a distillation section of an internal heat exchanging type distillation column, and an internal heat exchanging type distillation column, using the pipe/filler unit, capable of extracting and cleaning a distillation section, and a production method thereof.

Means for Solving the Problem

In order to solve the above problems, a pipe/filler unit of the present invention includes:

a pipe where heat is exchanged between an inside and an outside of a pipe wall,
an inside regular filler layer disposed inside the pipe so as to abut an inner peripheral surface of the pipe; and
an outside regular filler layer disposed outside the pipe so as to surround the pipe and closely contact an outer peripheral surface of the pipe.

Additionally, in the pipe/filler unit of the present invention, the outside regular filler layer is formed from a plurality of split tubular regular fillers which is split into a plurality of pieces in a peripheral direction, the plurality of split tubular regular fillers has a tubular structure disposed so as to cover an outer peripheral surface of the pipe, and the outside regular filler layer that is the tubular structure formed of the plurality of split tubular regular fillers is fastened by a fastening member so as to closely contact the outer peripheral surface of the pipe.

Additionally, in the pipe/filler unit of the present invention, the outer peripheral surface of the pipe is subjected to close contact-promoting processing for promoting the close contact feature between the outer peripheral surface and the outside regular filler layer.

Additionally, in the pipe/filler unit of the present invention, the close contact-promoting processing is at least one of
(a) the processing of winding a wire rod around the outer peripheral surface of the pipe;
(b) the processing of providing a convex shape on the outer peripheral surface of the pipe; and
(c) the processing of forming an excavated groove in the outer peripheral surface of the pipe.

Additionally, in the pipe/filler unit of the present invention, at least one of the wire rod, the convex shape, and the excavated groove is disposed at a predetermined angle in a spiral shape and at a predetermined interval as viewed in a direction parallel to an axial direction, at the outer peripheral surface of the pipe.

Additionally, in the pipe/filler unit of the present invention, if the close contact-promoting processing is the processing of winding a wire rod around the outer peripheral surface of the pipe, a wire rod whose diameter is 2 to 5 mm is used as the wire rod.

Additionally, in the pipe/filler unit of the present invention, when the wire rod is spirally wound around the outer peripheral surface of the pipe, an angle at which the wire rod is wound is 7 to 15° with respect to a plane orthogonal to the axial direction of the pipe.

Additionally, in the pipe/filler unit of the present invention, when the wire rod is spirally wound around the outer peripheral surface of the pipe, an interval from a center of the wire rod is 8 to 15 mm.

Additionally, in the pipe/filler unit of the present invention, a plurality of outside belt-like bodies which goes around the outside regular filler layer is disposed at a predetermined pitch in the axial direction of the pipe in an outer peripheral portion of the outside regular filler layer,
a plurality of cuts is formed at a pitch of 15 mm or less in a peripheral direction, in a side portion, which is located on an upper side when the pipe/filler unit is used, of both side portions of each outside belt-like body along its longitudinal direction, and
the side portion where the cuts of the outside belt-like body are formed is bent outward within a range of 40 to 90°.

Additionally, in the pipe/filler unit of the present invention, a plurality of inside belt-like bodies which goes around the inside regular filler layer is disposed at a predetermined pitch in the axial direction of the pipe in an outer peripheral portion of the inside regular filler layer,
a plurality of cuts is formed at a pitch of 15 mm or less in a peripheral direction, in a side portion, which is located on an upper side when the pipe/filler unit is used, of both side portions of each inside belt-like body along its longitudinal direction, and
the side portion where the cuts of the inside belt-like body are formed is bent outward within a range of 40 to 90°.

Additionally, a production method of an internal heat exchanging type distillation column of the present invention is a production method of an internal heat exchanging type distillation column configured such that
a pipe inside and a pipe outside of a single pipe (hereinafter referred to as single pipe) are isolated from each other inside a body barrel by connecting the single pipe with the body barrel by both end pipe plates, regular filler layers are disposed in the pipe inside and the pipe outside, respectively, gas and liquid inlets and gas and liquid outlets are disposed in the pipe inside and the pipe outside, respectively,
a difference is caused in operating temperature by causing a difference in operation pressure between the pipe inside and the pipe outside, and a high-pressure side on the side of the pipe inside functions as an enriching section and a low-pressure side on the side of the pipe outside functions as a stripping section by transferring heat to the low-pressure side on the side of the pipe outside from the high-pressure side on the side of the pipe inside, with a pipe wall of the single pipe as a heat transfer surface,
the method comprising the step of obtaining a structure in which the pipe/filler unit according to the above invention is inserted into the body barrel, whereby the pipe constituting the pipe/filler unit is used as the single pipe of the internal heat exchanging type distillation column, the inside of the pipe is used as the pipe inside of the internal heat exchanging type distillation column, the outside of the pipe is used as the pipe outside of the internal heat exchanging type distillation column, the inside regular filler layer constituting the pipe/filler unit is used as the regular filler layer of the pipe inside of the internal heat exchanging type distillation column, and the outside regular filler layer constituting the pipe/filler unit is used as the regular filler layer of the pipe outside of the internal heat exchanging type distillation column.

Additionally, a production method of an internal heat exchanging type distillation column of the present invention is a production method of an internal heat exchanging type distillation column having a structure in which a plurality of single pipe units having a structure in which a pipe inside and a pipe outside of each pipe are isolated from each other inside a body barrel by connecting a plurality of pipes with the body barrel by both end pipe plates, the pipe inside and the pipe outside have gas and liquid inlets and gas and liquid outlets, respectively, a regular filler layer is disposed inside each pipe constituting the plurality of pipes, the regular filler layer is disposed outside each pipe so as to surround an outer peripheral surface of each pipe, the regular filler layer disposed at the outer peripheral surface of each pipe is covered with a partition pipe made of a metallic thin plate for each pipe, is disposed at a predetermined pitch inside the body barrel, and which is configured such that a difference is caused in operating temperature by causing a difference in operation pressure between the pipe inside and the pipe outside, and a high-pressure side on the side of the pipe inside functions as an enriching section and a low-pressure side on the side of the pipe outside functions as a stripping section by transferring heat to the low-pressure side on the side of the pipe outside from the high-pressure side on the side of the pipe inside, with a pipe wall of each pipe constituting the plurality of pipes as a heat transfer surface, the method comprising the step of obtaining a structure in which the pipe/filler unit according to the above invention is inserted into the partition pipe, whereby the pipe constituting the pipe/filler unit is used as each pipe constituting the plurality of pipes of the internal heat exchanging type distillation column, the inside of the pipe is used as the pipe inside of the internal heat exchanging type distillation column, the outside of the pipe is used as the pipe outside of the internal heat exchanging type distillation column, the inside regular filler layer constituting the pipe/filler unit is used as the regular filler layer of the pipe inside of the internal heat exchanging type distillation column, and the outside regular filler layer constituting the pipe/filler unit is used as the regular filler layer of the pipe outside of the internal heat exchanging type distillation column.

Additionally, in the production method of an internal heat exchanging type distillation column of the present invention, with a plurality of partition pipes being disposed parallel to an axial direction of the body barrel inside the body barrel and the body barrel being raised vertically, the pipe/filler unit according to the above invention is inserted into each of the partition pipes from above.

Additionally, an internal heat exchanging type distillation column of the present invention is produced through the step of inserting the pipe/filler unit according to the above invention into the body barrel or partition pipe by the method according to the above invention.

Effects of the Invention

Since a pipe/filler unit of the present invention is adapted such that an inside regular filler layer is disposed inside a pipe where heat is exchanged between an inside and an outside of a pipe wall so as to abut an inner peripheral surface of the pipe, and an outside regular filler layer is disposed outside the pipe so as to surround the pipe and closely contact an outer peripheral surface of the pipe, the pipe/filler unit can be favorably used as, for example, a constructional member of a distillation section of an internal heat exchanging type distillation column of a packed column type which is adapted such that a pipe inside and a pipe outside of a single pipe or each pipe are isolated from each other inside the body barrel by connecting a single pipe or a plurality of pipes with a body barrel by both end pipe plates, a difference is caused in the operating temperature by causing a difference in operation pressure between the pipe inside and the pipe outside, and heat is exchanged between the low-pressure side and the high-pressure side by transferring heat to the low-pressure side from the high-pressure side.

That is, according to the pipe/filler unit of the present invention, it is possible to efficiently form the pipe inside and pipe outside of the internal heat exchanging type distillation column of a packed column type as described above, and it is possible to realize the internal heat exchanging type distillation column capable of integrally extracting the pipe/filler unit of the present invention constituting the distillation section, thereby easily performing maintenance, such as periodical extraction or cleaning.

Additionally, the outside regular filler layer is formed from a plurality of split tubular regular fillers, because the plurality of split tubular regular fillers has a tubular structure disposed so as to cover an outer peripheral surface of the pipe, and the outside regular filler layer that is the tubular structure is fastened by a fastening member so as to closely contact the outer peripheral surface of the pipe, it is possible to efficiently form the outside regular filler layer that is a tubular structure, it is possible to dispose the outside regular filler layer as to closely contact the outer peripheral surface of the pipe reliably, and it is possible to make the present invention more effective.

Additionally, the outer peripheral surface of the pipe is subjected to close contact-promoting processing for promoting the close contact feature between the outer peripheral surface and the outside regular filler layer. Thereby, it is possible to provide the pipe/filler unit which is excellent in the close contact feature between the outer peripheral surface of the pipe and the outside regular filler layer and which is more suitable in constituting a distillation section of an internal heat exchanging type distillation column.

Additionally, the close contact-promoting processing is at least one of (a) the processing of winding a wire rod around the outer peripheral surface of the pipe; (b) the processing of providing a convex shape on the outer peripheral surface of the pipe; and (c) the processing of forming an excavated groove in the outer peripheral surface of the pipe. Thereby, it is possible to reliably improve the close contact feature between the outer peripheral surface of the pipe and the outside regular filler layer and it is possible to make the present invention more effective.

Additionally, at least one of the wire rod, the convex shape, the excavated groove is disposed at a predetermined angle in a spiral shape and at a predetermined interval as viewed in a direction parallel to an axial direction, at the outer peripheral surface of the pipe. In this case, it is possible to allow a liquid to flow along the outer peripheral surface of the pipe while the outer peripheral surface of the pipe is made wet uniformly, and it is possible to provide a pipe/filler unit which is more suitable in constituting a distillation section of an internal heat exchanging type distillation column.

Additionally, if the processing of winding a wire rod around the outer peripheral surface of the pipe is performed as the close contact-promoting processing, a wire rod whose diameter is 2 to 5 mm is used as the wire rod. Thereby, it is possible to sufficiently improve the close contact feature between the outer peripheral surface (outer peripheral surface including the wire rod) of the pipe and the outside regular filler layer. Additionally, if the pipe/filler unit is used as a distillation section of an internal heat exchanging type distillation column, it is possible to make the outer peripheral surface of the pipe wet reliably by the liquid which flows down the pipe outside, and it is possible to make the present invention more effective.

Additionally, when the wire rod is spirally wound around the outer peripheral surface of the pipe, the angle at which the wire rod is wound is 7 to 15° with respect to a plane orthogonal to the axial direction of the pipe. Thereby, if the pipe/filler unit of the present invention is used as a distillation section of an internal heat exchanging type distillation column, it is possible to make the outer peripheral surface of the pipe wet reliably by the liquid which flows down the pipe outside, and it is possible to make the present invention more effective.

Additionally, when the wire rod is spirally wound around the outer peripheral surface of the pipe, an interval from a center of the wire rod is set to 8 to 15 mm. Thereby, if the pipe/filler unit of the present invention is used as a distillation section of an internal heat exchanging type distillation column, it is possible to make the outer peripheral surface of the pipe wet more reliably by the liquid which flows down the pipe outside, and it is possible to make the present invention more effective.

In addition, in the pipe/filler unit of the present invention, in order to adapt the angle and interval of the wire rod to an intended condition in spirally winding the wire rod around the pipe, it is necessary to wind a predetermined number of wire rods, but the required number of wire rods is determined according to the condition.

Additionally, a plurality of outside belt-like bodies which goes around the outside regular filler layer is disposed at a predetermined pitch in the axial direction of the pipe in an outer peripheral portion of the outside regular filler layer, a plurality of cuts is formed at a pitch of 15 mm or less in a peripheral direction, in a side portion, which is located on the upper side when the pipe/filler unit is used, of both side portions of each outside belt-like body along its longitudinal direction, and the side portion where the cuts of the outside belt-like body are formed is bent outward within a range of 40 to 90°. In this case, for example, if the pipe/filler unit of the present invention is used as a distillation section of an internal heat exchanging type distillation column, and the pipe/filler unit is accommodated in a partition pipe for partitioning the pipe outside, it is possible to guide the liquid, which flows down an inner peripheral surface of the partition pipe, to the outside regular filler layer, it is possible to reduce the amount of the liquid which flows down the inner peripheral surface of the partition pipe and to uniformly disperse the liquid in the regular filler outside the pipe, and it is possible to obtain an internal heat exchanging type distillation column with high distillation performance.

Additionally, a plurality of inside belt-like bodies which goes around the inside regular filler layer is disposed at a predetermined pitch in the axial direction of the pipe in an outer peripheral portion of the inside regular filler layer, a plurality of cuts is formed at a pitch of 15 mm or less in a peripheral direction, in a side portion, which is located on the upper side when the pipe/filler unit is used, of both side portions of each inside belt-like body along its longitudinal direction, and the side portion where the cuts of the inside belt-like body are formed is bent outward within a range of 40 to 90°, In this case, for example, if the pipe/filler unit of the present invention is used as a distillation section of an internal heat exchanging type distillation column, and the inside of the pipe is made to function as the pipe inside, it is possible to efficiently guide the liquid, which flows down an inner peripheral surface of the pipe, to the inside regular filler layer (regular filler of the pipe inside) via a bent portion of the inside belt-like body, it is possible to reduce the amount of the liquid which flows down the inner peripheral surface of the pipe and to reduce the thickness the liquid which flows down, thereby reducing heat transfer resistance, and it is possible to secure the amount of liquid which is required to perform sufficient gas-liquid contact as the amount of the liquid which flows down the surface of the regular filler, thereby improving distillation efficiency.

Additionally, if a production method of an internal heat exchanging type distillation column of the present invention is adapted to obtain a structure in which the pipe/filler unit according to the present invention is inserted into the body barrel, the pipe constituting the pipe/filler unit is used as the single pipe of the internal heat exchanging type distillation column, the inside of the pipe is used as the pipe inside of the internal heat exchanging type distillation column, the outside of the pipe is used as the pipe outside of the internal heat exchanging type distillation column, the inside regular filler layer constituting the pipe/filler unit is used as the regular filler layer of the pipe inside of the internal heat exchanging type distillation column, and the outside regular filler layer constituting the pipe/filler unit is used as the regular filler layer of the pipe outside of the internal heat exchanging type distillation column. Thus, it is possible to efficiently produce an internal heat exchanging type distillation column in which the high-pressure side on the side of the pipe inside functions as an enriching section and the low-pressure side on the side of the pipe outside functions as a stripping section by transferring heat to the low-pressure side on the side of the pipe outside from the high-pressure side on the side of the pipe inside, with a pipe wall of the single pipe as a heat transfer surface, and it is possible to provide an internal heat exchanging type distillation column capable of extracting and easily cleaning a distillation section (that is, the pipe/filler unit of the present invention).

Additionally, the internal heat exchanging type distillation column which has a structure in which a single pipe is disposed inside the body barrel produced by this method is used as one distillation unit, and the number of distillation units is increased if necessary. Thereby, it is possible to cope with an increase in throughput flexibly, which is meaningful.

Additionally, since a unit in which the regular filler layers which are disposed inside and outside the pipe are integrated is fabricated separately from the body barrel, it is possible to perform confirmation or attachment/detachment of a regular filler until the regular filler disposed at the outer peripheral surface of the pipe is inserted into body barrel, and it is possible to perform high-precision reliable fabrication so that many performance (that is, distillation separation efficiency and internal heat exchanging performance) as an internal heat exchanging type distillation column can be exhibited sufficiently.

Additionally, if a production method of an internal heat exchanging type distillation column of the present invention is adapted to obtain a structure in which the pipe/filler unit according to the present invention is inserted into the partition pipe, the pipe constituting the pipe/filler unit is used as each pipe constituting a plurality of pipes of the internal heat exchanging type distillation column, the inside of the pipe is used as the pipe inside of the internal heat exchanging type distillation column, the outside of the pipe is used as the pipe outside of the internal heat exchanging type distillation column, the inside regular filler layer constituting the pipe/filler unit is used as the regular filler layer of the pipe inside of the internal heat exchanging type distillation column, and the outside regular filler layer constituting the pipe/filler unit is used as the regular filler layer of the pipe outside of the internal heat exchanging type distillation column. Thus, it is possible to efficiently produce an internal heat exchanging type distillation column of a packed column type in which a pipe inside and a pipe outside of each pipe are isolated from each other inside a body barrel by connecting a plurality of pipes with the body barrel by both end pipe plates, the pipe inside and the pipe outside have gas and liquid inlets and gas and liquid outlets, respectively, a difference is caused in operating temperature by causing a difference in operation pressure between the pipe inside and the pipe outside, and a high-pressure side on the side of the pipe inside functions as an enriching section and a low-pressure side on the side of the pipe outside functions as a stripping section by transferring heat to the low-pressure side on the side of the pipe outside from the high-pressure side on the side of the pipe inside, with a pipe wall of each pipe as a heat transfer surface.

That is, it is possible to efficiently produce an internal heat exchanging type distillation column having a structure in which a plurality of single pipe units having a structure in which the regular filler layer is disposed inside each pipe constituting a plurality of pipes, and the regular filler layer is disposed inside each pipe so as to surround an outer peripheral surface, and the regular filler layer disposed at the outer peripheral surface of each pipe is covered with the partition pipe made of a metallic thin plate for each pipe, is disposed at a predetermined pitch inside the body barrel, and which is configured such that the high-pressure side on the side of the pipe inside functions as an enriching section and the low-pressure side on the side of the pipe outside functions as a stripping section by transferring heat to the low-pressure side on the side of the pipe outside from the high-pressure side on the side of the pipe inside, with a pipe wall of each pipe constituting a plurality of pipes as a heat transfer surface.

In addition, in the configuration of the above-described Patent Document 1, a step of detaching a metallic thin plate (partition pipe) is required when an attempt to detach a pipe outside regular filler layer is made. However, by using the pipe/filler unit of the present invention, it is possible to easily attach or detach the pipe outside filler only by integrally extracting the pipe/filler unit (distillation section) of the present invention from the partition pipe or inserting the pipe/filler unit into the partition pipe, without requiring such a step.

Additionally, in the configuration of the above-described Patent Document 1, in order to seal gas and liquid which flows in a lower portion of a pipe outside of a single pipe unit, a metallic thin plate which covers the single pipe unit is connected to a pipe plate or the like which is connected to the body barrel at its lower portion. As a result, the operation of detaching the connected part is very difficult, and actually, a distillation section cannot be extracted from the body barrel. Even so, if an operator tries to extract the distillation section, the pipe outside regular filler layer should be detached every a metallic thin plate (partition pipe). As a result, a significant amount of labor for detaching the connected part between the metallic thin plate and the body barrel is required. However, in case of the present invention, only the pipe/filler unit can be extracted and removed from the partition pipe. Therefore, it is possible to significantly reduce the number of man-hours without the need for detaching the partition pipe fixed to the body barrel from the body barrel.

Additionally, with a plurality of partition pipes being disposed parallel to an axial direction of the body barrel inside the body barrel and the body barrel being raised vertically, the pipe/filler unit according to the present invention is inserted into each of the partition pipes from above. In this case, even when the pipe/filler unit has a considerable length, it is possible to easily and reliably insert the pipe/filler unit into the partition pipe, and it is possible to make the present invention more effective.

Additionally, the internal heat exchanging type distillation column of the present invention is produced by the method according to the present invention. Thus, it is possible to provide an internal heat exchanging type distillation column, in which regular fillers are reliably filled into the pipe outside and the pipe inside, having high distillation performance and capable of extracting and cleaning the distillation section.

BRIEF DESCRIPTION OF THE DRAWINGS

FIG. 3A is a perspective view, FIG. 3B is a plan view, and FIG. 3C is a side view.

DESCRIPTION OF THE REFERENCE SYMBOLS

1: PIPE
2: INSIDE REGULAR FILLER LAYER
3: OUTSIDE REGULAR FILLER LAYER
3a, 3b: HALF-SPLIT TUBULAR REGULAR FILLER
6: WIRE ROD
12: INSIDE BELT-LIKE BODY
12a: SIDE PORTION
12b: CUT
13: OUTSIDE BELT-LIKE BODY
13a: SIDE PORTION
13b: CUT
21: BODY BARREL
23a: UPPER PIPE PLATE
23b: LOWER PIPE PLATE

24: PIPE INSIDE (ENRICHING SECTION)
25: PIPE OUTSIDE (STRIPPING SECTION)
26: STRIPPING SECTION LIQUID INLET
27: STRIPPING SECTION STEAM OUTLET
28: ENRICHING SECTION LIQUID INLET
29: ENRICHING SECTION STEAM OUTLET
30: STRIPPING SECTION STEAM INLET
31: STRIPPING SECTION LIQUID OUTLET
32: ENRICHING SECTION STEAM INLET
33: ENRICHING SECTION LIQUID OUTLET
34a: END CHAMBER
34b: END CHAMBER
35: PARTITION PIPE
36a: UPPER PARTITION PLATE
36a: LOWER PARTITION PLATE
37a: OPENING
37b: OPENING
38: LIQUID DISTRIBUTOR
40: SINGLE PIPE UNIT
A: PIPE/FILLER UNIT
H: INTERNAL HEAT EXCHANGING TYPE DISTILLATION COLUMN
Ha: INTERNAL HEAT EXCHANGING TYPE DISTILLATION COLUMN LOWER BODY
L1: LENGTH OF CUT FROM UPPER SIDE PORTION OF BELT-LIKE BODY TO TIP THEREOF
L2: DIMENSION, IN WIDTH DIRECTION, OF PORTION WHERE CUT IS NOT FORMED
P1, P2, P3: PITCH

BEST MODE FOR CARRYING OUT THE INVENTION

Embodiments of the present invention will be shown below and features of the present invention will be in more detail.

Embodiment 1

Figure 1:
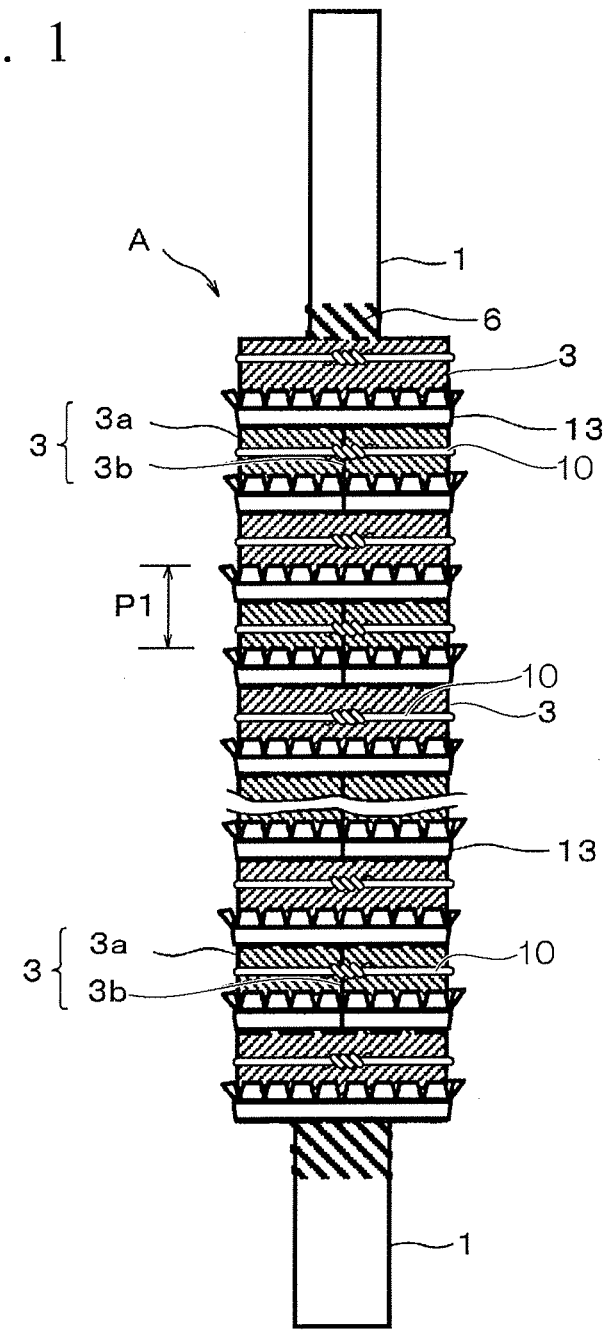
FIG. 1 is a view showing the configuration of a pipe/filler unit according to one embodiment (Embodiment 1) of the present invention.
Figure 2:
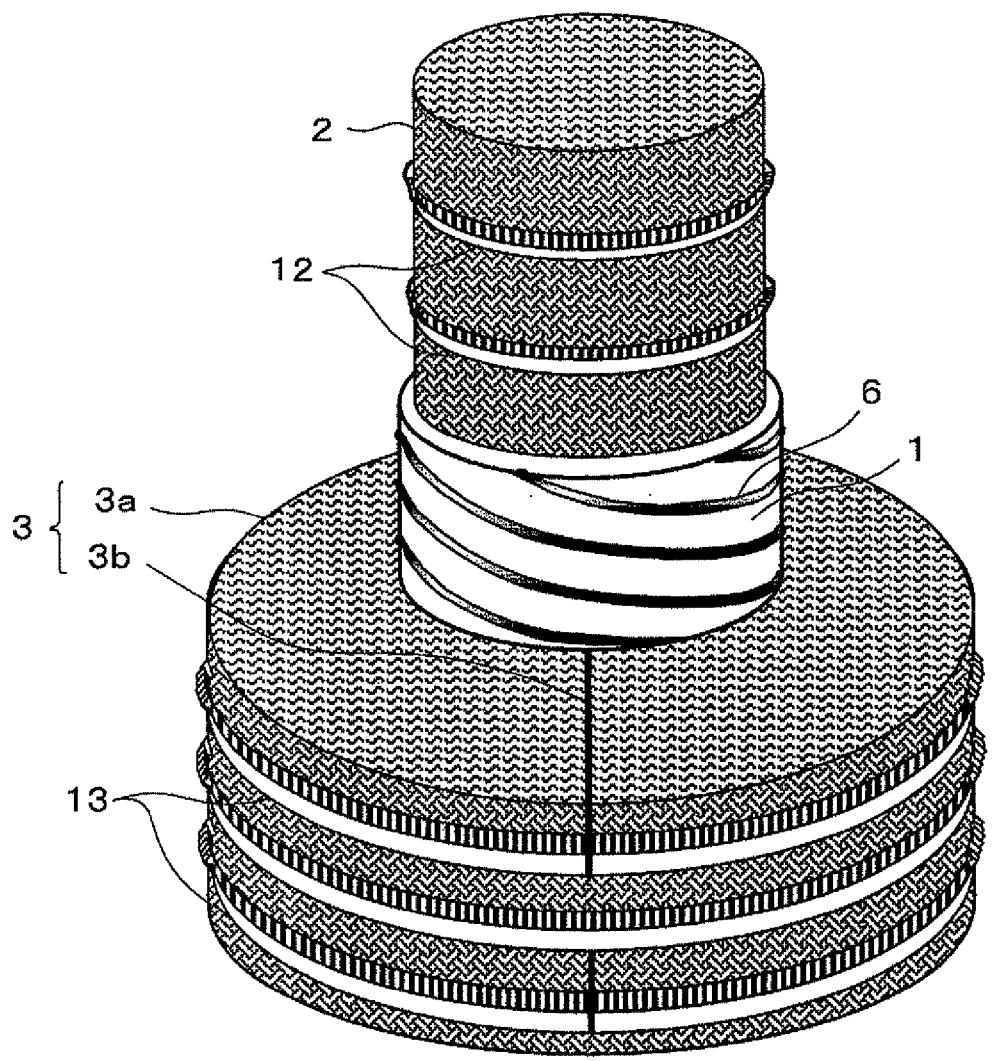
FIG. 2 is a perspective view showing the configuration of main parts of the pipe/filler unit according to Embodiment 1 of the present invention.
Figure 3A:
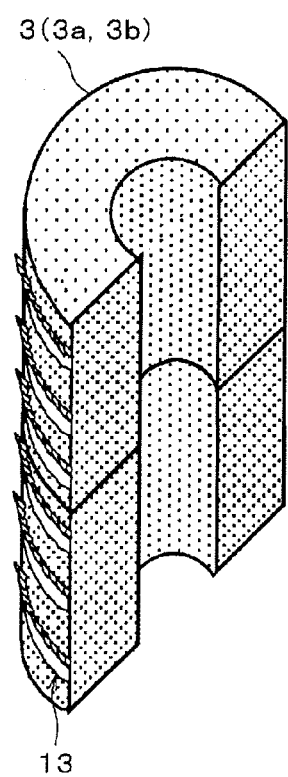
FIGS. 3A to 3C are views showing the configuration of an outside regular filler layer constituting the pipe/filler unit according to Embodiment 1 of the present invention.
Figure 3B:
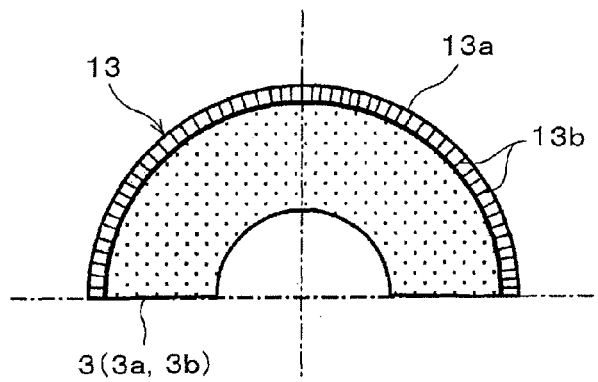
Figure 3C:
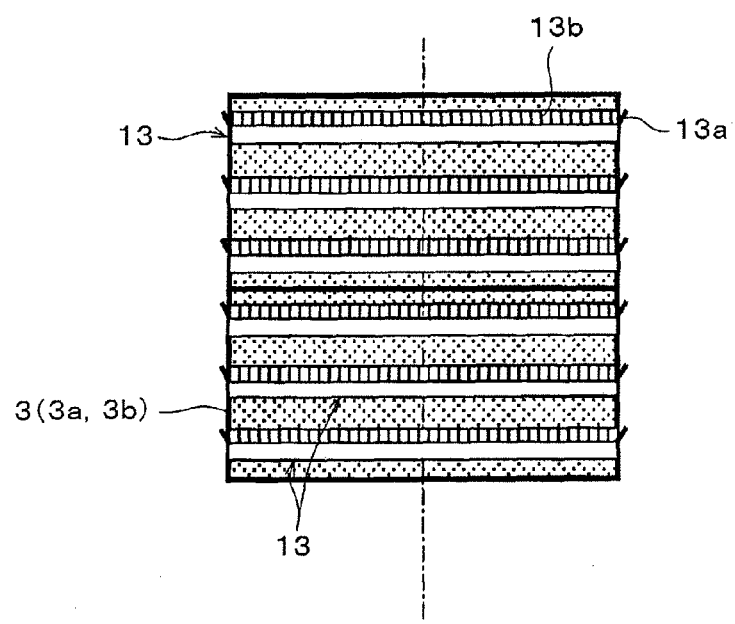
Figure 4:
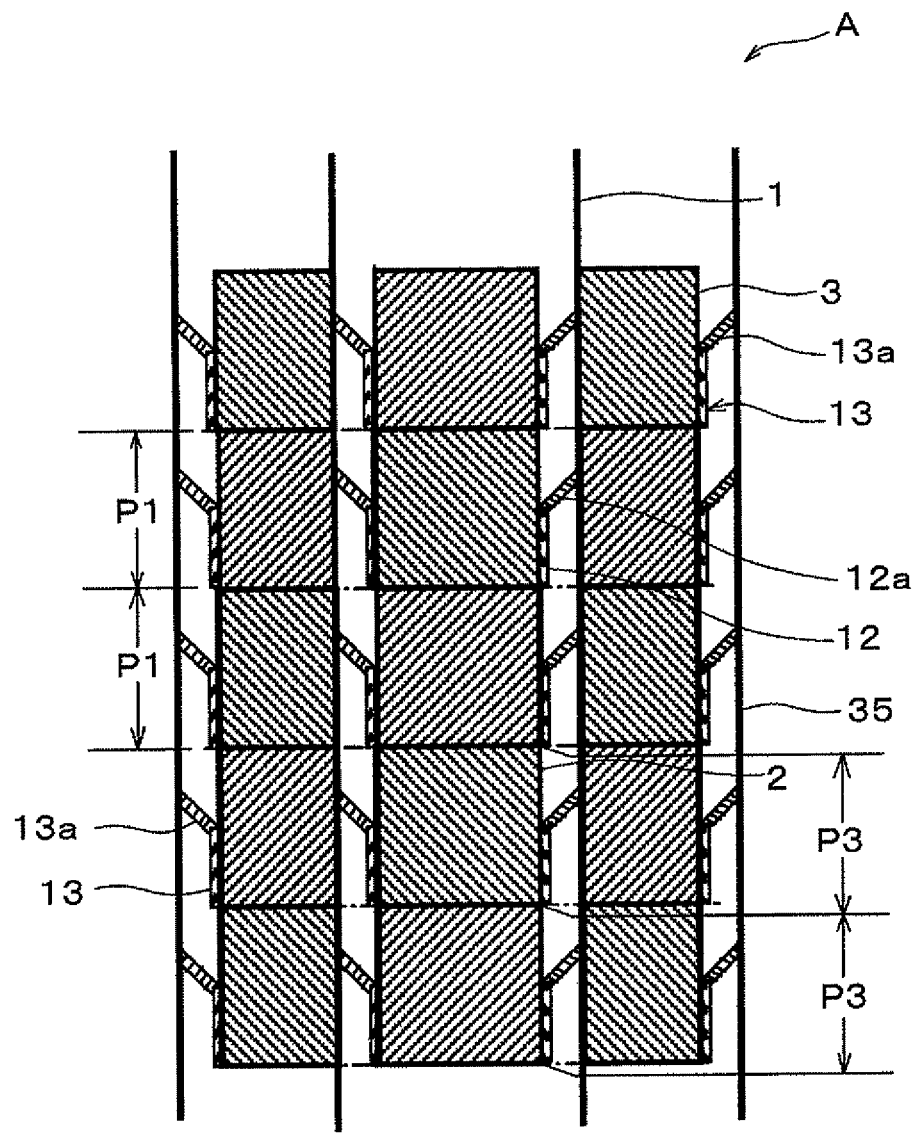
FIG. 4 is a front sectional view of the pipe/filler unit according to Embodiment 1 of the present invention.

FIG. 1 is a view showing the configuration of a pipe/filler unit according to one embodiment (Embodiment 1) of the present invention, FIG. 2 is a perspective view showing the configuration of main parts, FIGS. 3A to 3C are views showing the configuration of an outside regular filler layer of the present invention, and FIG. 3A is a perspective view, FIG. 3B is a plan view, and FIG. 3C is a side view, and FIG. 4 is a front sectional view of the pipe/filler unit of the present invention.

A pipe/filler unit A of this Embodiment 1 includes a pipe 1 where heat is exchanged between the inside and the outside of a pipe wall, an inside regular filler layer 2 disposed inside the pipe 1 so as to abut an inner peripheral surface of the pipe 1, and an outside regular filler layer 3 disposed outside the pipe 1 so as to surround the pipe 1 and closely contact an outer peripheral surface of the pipe 1.

In addition, the diameter of the pipe 1 is adjusted on the way in a height direction such that the diameter is stepwisely increased downward by a reducer (not shown).

The outside regular filler layer 3 is formed from half-split tubular regular fillers 3a and 3b which are split into two in parallel in an axial direction, the half-split tubular regular fillers 3a and 3b are disposed so as to cover the outer peripheral surface of the pipe 1, thereby establishing a tubular structure, and the outside regular filler layer 3 that is a tubular structure composed of the half-split tubular regular fillers 3a and 3b is fastened by a fastening member 10 so as to closely contact the outer peripheral surface of the pipe 3. That is, in this Embodiment 1, the outside regular filler layer 3 is attached and fixed so as to closely contact the outer peripheral surface of the pipe 1 by winding and fastening a wire as a fastening member 10 around an outer periphery of the outside regular filler layer 3.

In addition, in the pipe/filler unit A of this Embodiment 1, an iron pipe with an external diameter of 200 mm and a thickness of 6 mm is used as the pipe 1.

Additionally, a plurality of outside belt-like bodies 13 (refer to FIG. 5) which goes around the outside regular filler layer 3 is disposed at a predetermined pitch P1 (P1=60 mm in this Embodiment 1) in the axial direction of the pipe 1 at an outer peripheral portion of the outside regular filler layer 3. In addition, the pitch P1 is set to an appropriate value according to conditions, such as the diameter of the pipe or the dimensions of the outside regular filler layer 3, applications, etc.

Additionally, a plurality of cuts 13b is formed at a pitch of 15 mm or less in a peripheral direction, in a side portion 13a (refer to FIGS. 3A to 3C), which is located on the upper side when the pipe/filler unit A is used, of both side portions of the outside belt-like body 13 along its longitudinal direction, and a side portion 13a where the cuts 13b of the outside belt-like body 13 are formed is bent outward within a range of 40 to 90°.

Figure 5:
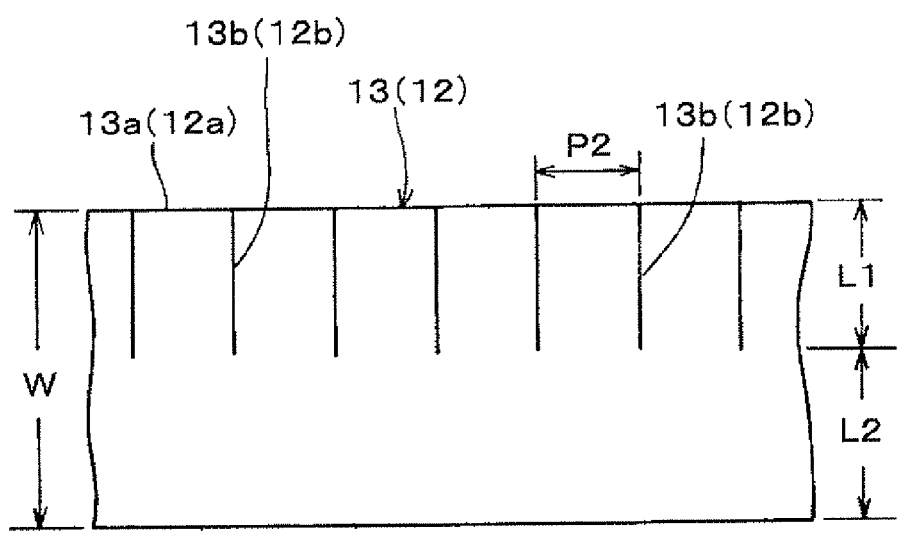
FIG. 5 is a plan view showing the configuration of outside and inside belt-like bodies used in the pipe/filler unit according to Embodiment 1 of the present invention.

Specifically, the outside belt-like body 13 is formed, for example, by processing a high elastic thin plate (SUS304-CSP-H) having a thickness of 0.1 mm and made of metal (made of stainless in this Embodiment 1), and as shown in FIG. 5, the plurality of cuts 13b are formed at a predetermined pitch P2 (P2=7 mm in this embodiment) in the peripheral direction, in the upper side portion 13a of both side portions, having a width of about 22 mm, along its longitudinal direction. In addition, as high elastic SUS304-CSP-H is used as the material of the outside belt-like body 13, a force which is going to maintain a shape which is bent outward within a range of 40 to 90° is exerted. Therefore, when the pipe/filler unit A has been accommodated in a partition pipe 35 which will be described below, it is possible to more reliably guide a liquid which flows down an inner peripheral surface of the partition pipe 35 to the outside regular filler layer 3.

Additionally, a length L1 of the cuts 13b from the upper side portion of the outside belt-like body 13 to the tip thereof is 10 mm, and a dimension L2, in the width direction, of a portion where no cut is formed is 12 mm.

Additionally, the inside regular filler layer 2 is formed in a columnar shape, and a plurality of inside belt-like bodies 12 which goes around the inside regular filler layer 2 are disposed at a predetermined pitch P3 (P3=60 mm in this Embodiment 1) in the axial direction of the pipe 1 at an outer peripheral portion of the inside regular filler layer (refer to FIG. 4).

Additionally, an inside belt-like body of the same configuration and same material as the outside belt-like body 13 is used as the inside belt-like body 12, and a plurality of cuts 12b is formed at a predetermined pitch P2 (P4=7 mm in this Embodiment 1) in the peripheral direction at an upper side portion 12a.

Additionally, the length L1 of the cuts 12b from the upper side portion of the inside belt-like body 12 to the tip thereof is 10 mm, and the dimension L2, in the width direction, of a portion where no cut is formed is 12 mm.

Additionally, as close contact-promoting processing for promoting the close contact feature between the outer peripheral surface of the pipe 1 and the outside regular filler layer 3, the processing of spirally winding a wire rod (iron wire rod with a circular cross-sectional shape) 6 is performed on the outer peripheral surface of the pipe 1.

In addition, in this Embodiment 1, an iron wire rod whose diameter is 2 to 5 mm is used as the wire rod 6. Additionally, the wire rod 6 is spirally wound around the outer periphery of the pipe 1 at an angle of 7 to 15° with respect to a plane orthogonal to the axial direction of the pipe in such a manner that the interval of the wire rod 6 becomes 8 to 15 mm in the axial direction of the pipe 1, and is fixed to the outer peripheral surface of the pipe 1 by spot welding.

In addition, here, although the processing of spirally winding the wire rod 6 has been performed as the close contact-promoting processing of the outside regular filler layer 3 to the outer peripheral surface of the pipe 1, aspects (angle, the interval of a wire rod, etc.) of winding of the wire rod 6 are not limited to the configuration of this embodiment, and can be carried out in various manners.

Additionally, the close contact-promoting processing of the outside regular filler layer 3 to the outer peripheral surface of the pipe 1 is not limited to a method of winding the wire rod 6, and as the close contact-promoting processing, the processing of providing the outer peripheral surface of the pipe 1 with a convex shape can be performed, or the processing of forming an excavated groove around the pipe 1 can also be performed.

Additionally, although the case where the outside regular filler layer 3 is split into two in a split tubular shape has been described as an example in this Embodiment 1, the aspect of splitting is not limited thereto, and various modifications can be made in consideration of easiness of production, the close contact feature of the outside regular filler layer to the outer peripheral surface of the pipe, etc.

Embodiment 2

Figure 6:
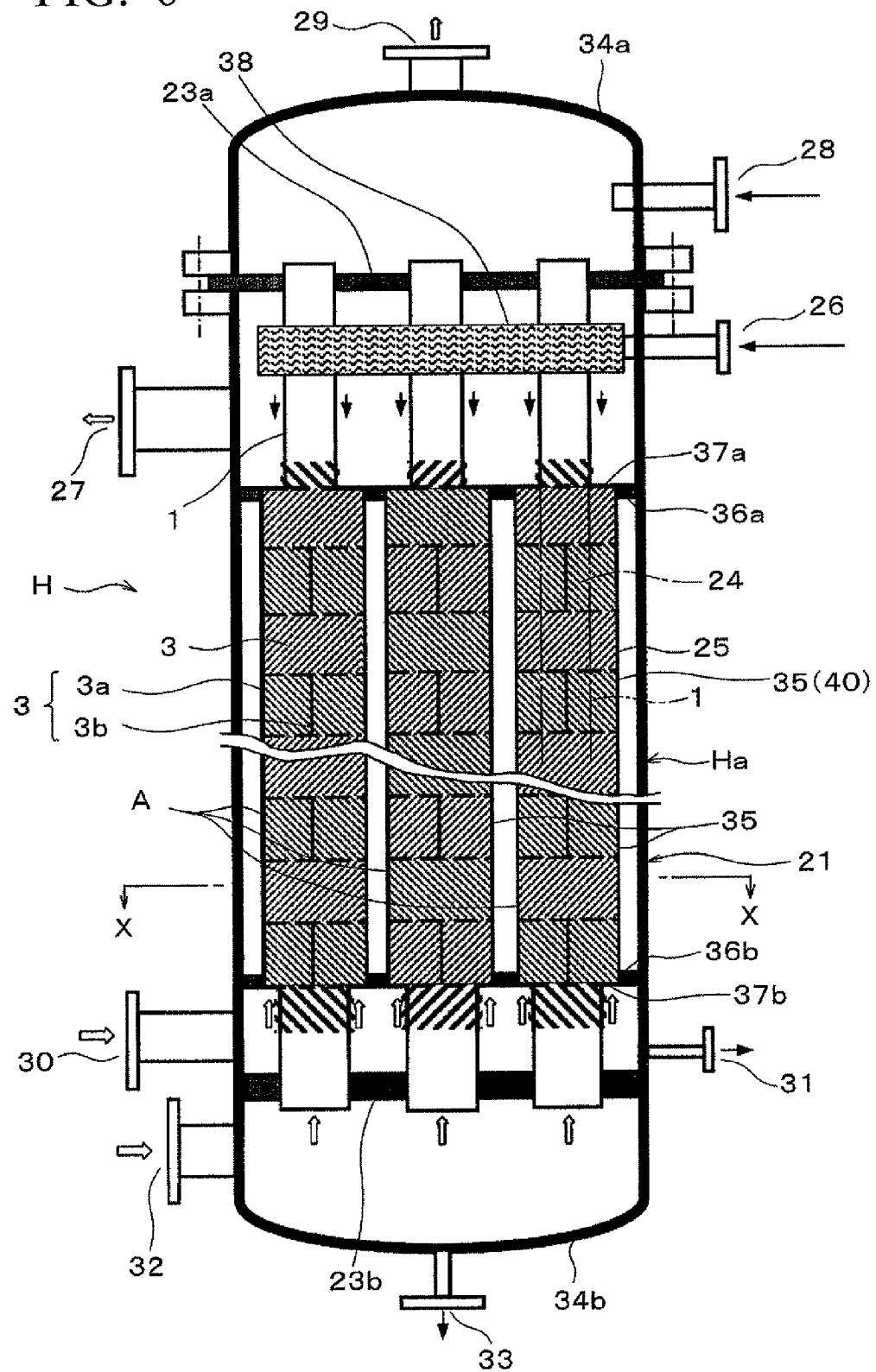
FIG. 6 is a view showing the configuration of an internal heat exchanging type distillation column according to an embodiment (Embodiment 2) of the present invention.
Figure 7:
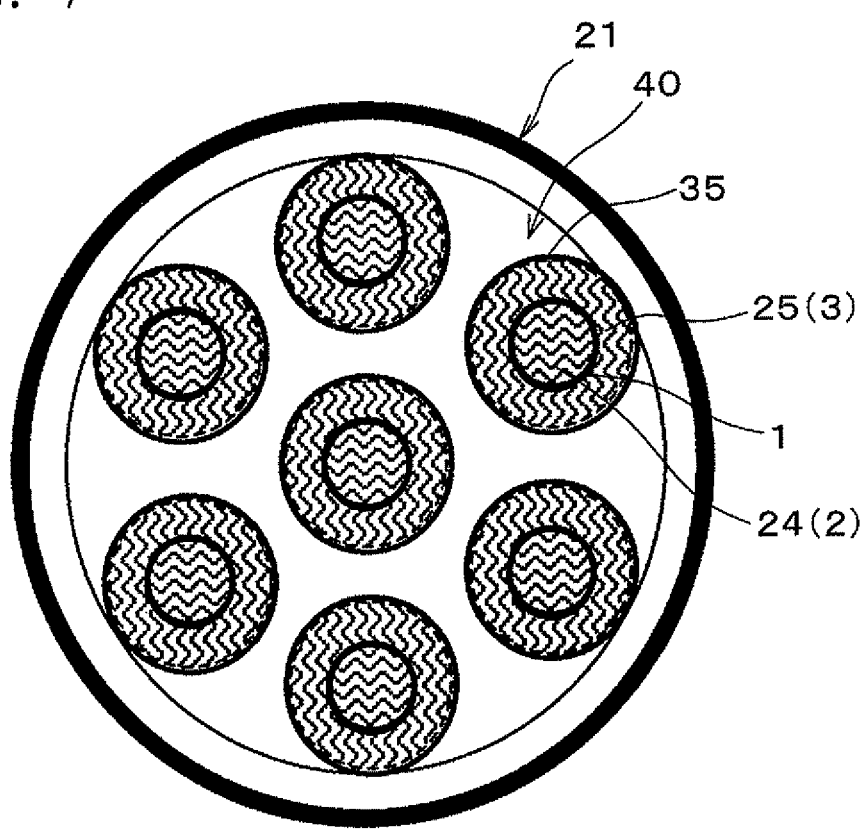
FIG. 7 is a sectional view taken along a line x-x of FIG. 6.

FIG. 6 is a view showing the configuration of an internal heat exchanging type distillation column H according to Embodiment 2 of the present invention using the pipe/filler unit of the above Embodiment 1 as a constituent material of a distillation section, and FIG. 7 is a sectional view taken along a line X-X of FIG. 6.

Figure 8:
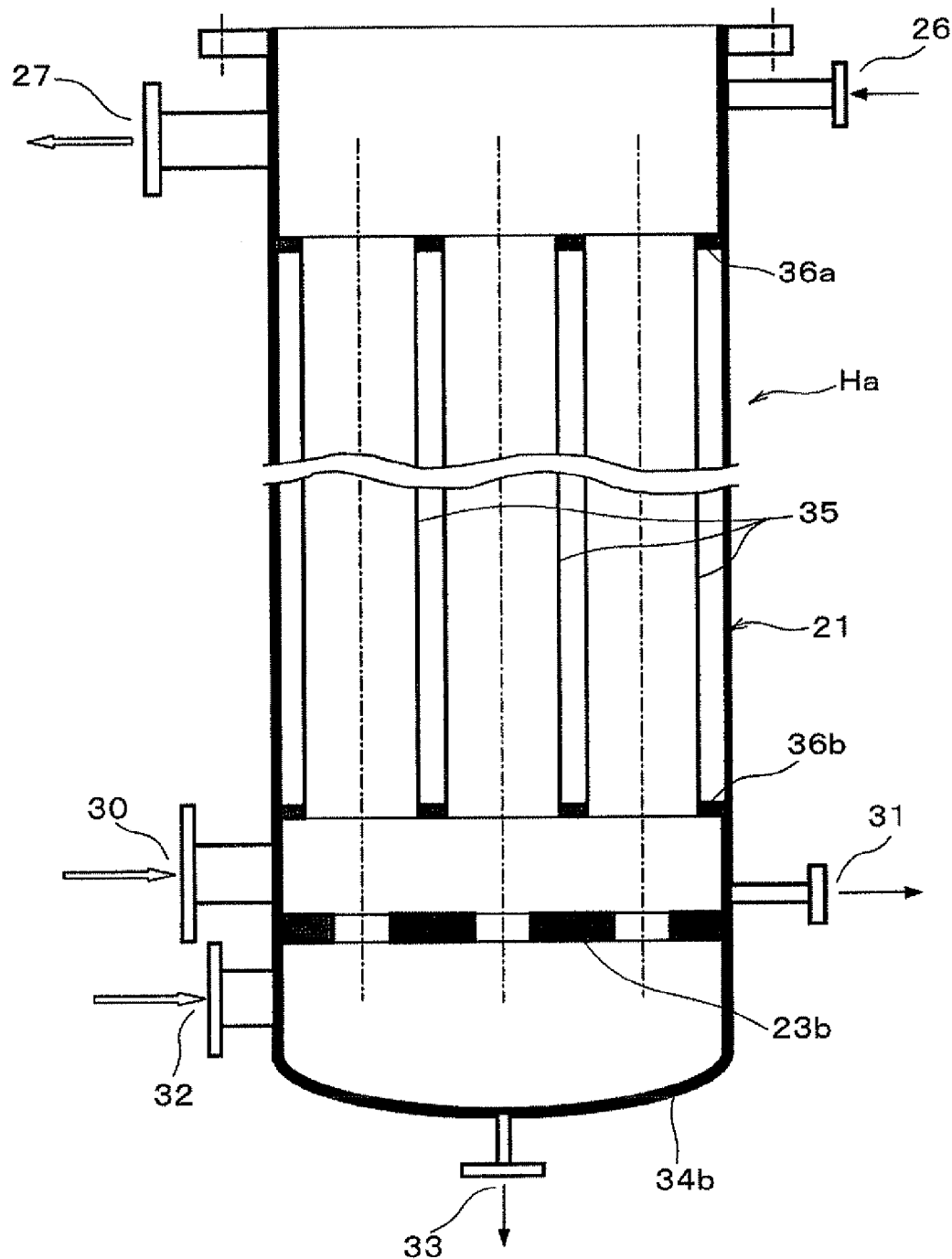
FIG. 8 is a sectional view showing the configuration of an internal heat exchanging type distillation column lower body constituting the internal heat exchanging type distillation column according to Embodiment 2 of the present invention.
Figure 9:
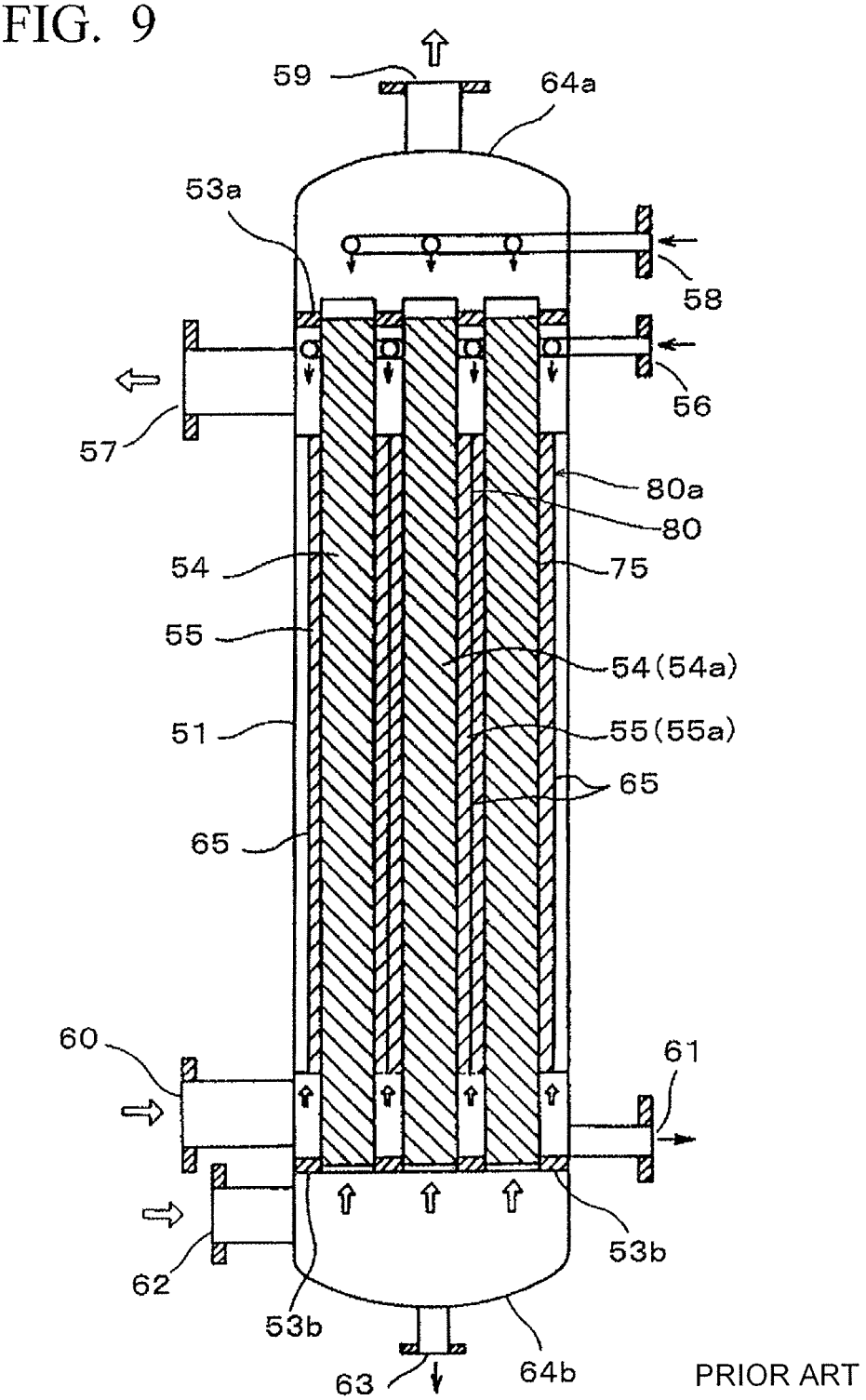
FIG. 9 is a view showing the configuration of a conventional internal heat exchanging type distillation column.
Figure 10:
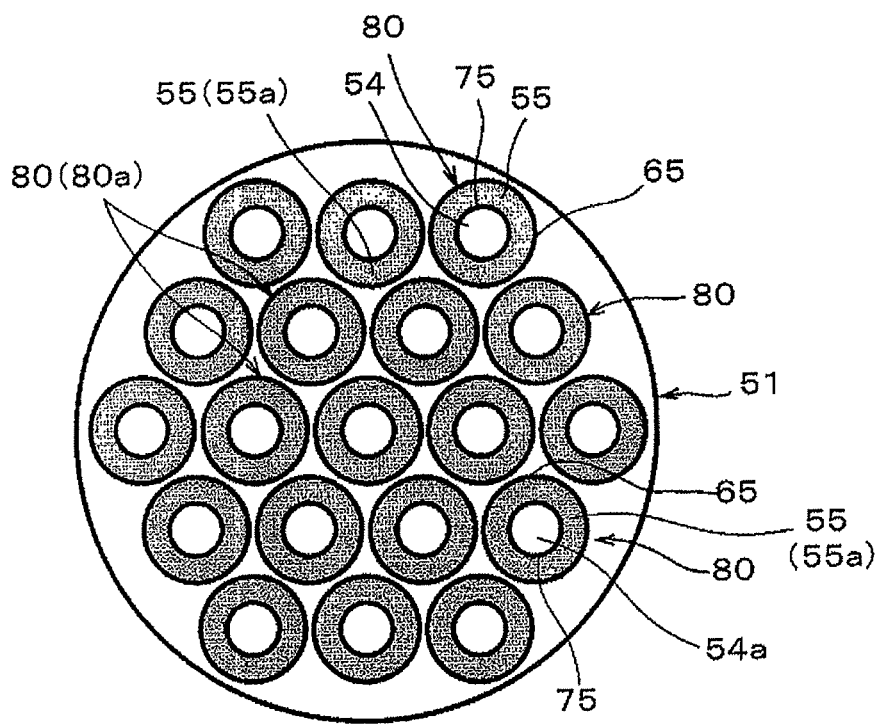
FIG. 10 is a plan sectional view of the conventional internal heat exchanging type distillation column.

Additionally, FIG. 8 is a sectional view showing the configuration of an internal heat exchanging type distillation column lower body Ha before the pipe/filler unit, etc. of the present invention are disposed.

The internal heat exchanging type distillation column H of this Embodiment 2, as shown in FIGS. 6 and 7, includes a body barrel 21, a plurality of pipes 1 that is inserted into the body barrel 21, and an upper pipe plate 23a and a lower pipe plate 23b that connect the plurality of pipes 75 to the body barrel 51. In addition, a pipe inside 24 and a pipe outside 25 of each pipe 1 are separated from each other, the pipe inside 24 functions as an enriching section on the high-pressure side, and the pipe outside 25 functions as a stripping section on the low-pressure side.

Additionally, a stripping section liquid inlet 26 for supplying liquid to the pipe outside (stripping section) 25 and a stripping section steam outlet 27 which allows the steam from the pipe outside (stripping section) 25 to be extracted therethrough are disposed in an upper portion of the body barrel 21, and an enriching section liquid inlet 28 for supplying liquid to the pipe inside (enriching section) 24 and an enriching section steam outlet 29 which allows the steam from the pipe inside (enriching section) 24 to be extracted therethrough are disposed in an end chamber 34a which communicate with the pipe inside (enriching section) 24 above the upper pipe plate 23a.

On the other hand, a stripping section steam inlet 30 for supplying steam to the pipe outside (stripping section) 25 and a stripping section liquid outlet 31 which allows the liquid from the pipe outside (stripping section) 25 to be extracted therethrough are disposed in a lower portion of the body barrel 21, and an enriching section steam inlet 32 for supplying steam to the pipe inside (enriching section) 24 and an enriching section liquid outlet 33 which allows the liquid from the pipe inside (enriching section) 24 to be extracted therethrough are disposed in an end chamber 34b which communicate with the pipe inside (enriching section) 24 below the lower pipe plate 23b. Additionally, the pipe inside (enriching section) 24 and the pipe outside (stripping section) 25 are filled with the inside and outside regular filler layers 2 and 3.

Also, in the internal heat exchanging type distillation column H of this embodiment, as shown in FIGS. 6 and 7, a plurality of single pipe units 40 having a structure in which the regular filler layer 2 is disposed inside the pipe 1, the outside regular filler layer 3 is disposed so as to surround the outer peripheral surface of the pipe 1, and the filler layer 3 disposed at the outer peripheral surface of the pipe 1 is covered with a partition pipe 35 made of a metallic thin plate and having a circular cross-sectional shape in a direction orthogonal to the axial direction are disposed at a predetermined pitch inside the body barrel 21, whereby the pipe inside 24 and pipe outside 25 of each pipe 1 are isolated from each other inside the body barrel 21, the inside regular filler layer 2 is disposed inside each pipe 1, and the outside regular filler layer 3 is disposed around each pipe 1.

Additionally, an upper partition plate 36a and a lower partition plate 36b are disposed at an upper end and a lower end of the outside regular filler layer 3, and an opening 37a that is a supply port of liquid to the pipe outside (stripping section) 25 and that is also a steam outlet from the pipe outside (stripping section) 25 and an opening 37b that is a discharge port of liquid from the pipe outside (stripping section) 25 and that is also a supply port of steam to the pipe outside (stripping section) 25 are disposed at the upper partition plate 36a and the lower partition plate 36b, respectively.

Additionally, a liquid distributor 38 for distributing the liquid supplied from the stripping section liquid inlet 26, and supplying the liquid to the pipe outside (stripping section) 25 is disposed between the upper pipe plate 23a and the upper partition plate 36a.

Also, in the internal heat exchanging type distillation column H of this Embodiment 2, the pipe 1, the pipe inside 24 in which the inside regular filler layer 2 was disposed, and the pipe outside 25 in which the outside filler layer 3 is disposed are configured by inserting the pipe/filler unit A of the above Embodiment 1 shown in FIG. 1 into the partition pipe 35 of the internal heat exchanging type distillation column lower body Ha as shown in FIG. 8.

In addition, in the internal heat exchanging type distillation column H shown in FIGS. 6 and 7, the outside belt-like bodies 13 are disposed at an outer periphery of the outside regular filler layer 3 as shown in FIG. 1, but their illustration is omitted in FIGS. 6 and 7.

Next, a production method of the internal heat exchanging type distillation column H of this Embodiment 2 will be described with reference to FIGS. 6, 7 and 8.

First, the internal heat exchanging type distillation column lower body Ha having a structure as shown in FIG. 8 is fabricated.

This internal heat exchanging type distillation column lower body Ha is a structure in which the pipe/filler unit A constituting the distillation section is not disposed and is a structure before the upper end chamber 34a including the enriching section liquid inlet 28 and the enriching section steam outlet 29, the upper pipe plate 23a, the liquid distributor 38, etc., which are to be disposed after the pipe/filler unit A is disposed, are disposed, and a plurality of partition pipes 35 is disposed inside the body barrel 21.

In this internal heat exchanging type distillation column lower body Ha, for example, it is possible to assemble the body barrel 21 in a transversely placed state, and it is possible to perform high-precision assembling.

Then, this internal heat exchanging type distillation column lower body Ha is raised vertically, and the pipe/filler unit A which becomes the distillation section is inserted into each partition pipe 35 of a plurality of partition pipes 35 from above.

Thereafter, the internal heat exchanging type distillation column H as shown in FIG. 6 is fabricated by attaching the liquid distributor 38, the upper pipe plate 23a, the end chamber 34a, etc.

In the internal heat exchanging type distillation column of the present invention, as described above, a distillation section is constructed by inserting the pipe/filler unit A into the partition pipe 35. Thus, it is possible to easily and reliably realize a structure in which the pipe 1 constituting the pipe/filler unit A is used as each pipe constituting a plurality of pipes of the internal heat exchanging type distillation column, the inside of the pipe 1 is used as the pipe inside 24 of the internal heat exchanging type distillation column H, the outside of the pipe 1 is used as the pipe outside 25 of the internal heat exchanging type distillation column H, the inside regular filler layer 2 constituting the pipe/filler unit A is used as the regular filler layer of the pipe inside 24, and the outside regular filler layer 3 constituting the pipe/filler unit A is used as the regular filler layer of the pipe outside 25.

Accordingly, according to the present invention, it is possible to efficiently produce the internal heat exchanging type distillation column H which has a structure in which a plurality of single pipe units 40 having a structure in which the inside regular filler layer 2 is disposed inside each pipe 1 constituting a plurality of pipes, and the outside regular filler layer 3 is disposed outside each pipe 1 so as to surround an outer peripheral surface, and the outside regular filler layer 3 disposed at the outer peripheral surface of each pipe is covered with the partition pipe 35 made of a metallic thin plate for each pipe 1, is disposed at a predetermined pitch inside the body barrel 21, and which is configured such that the high-pressure side on the side of the pipe inside 24 functions as an enriching section and the low-pressure side on the side of the pipe outside 25 functions as a stripping section by transferring heat to the low-pressure side on the side of the pipe outside 25 from the high-pressure side on the side of the pipe inside 24, with a pipe wall of each pipe 1 constituting a plurality of pipes as a heat transfer surface.

Additionally, in the case of the internal heat exchanging type distillation column H of this Embodiment 2, as described above, a distillation section is formed by inserting the pipe/filler unit A into the partition pipe 35. Therefore, a filler outside a pipe can be easily attached or detached only by integrally extracting the pipe/filler unit (distillation section) A from the partition pipe 35 or inserting the pipe/filler unit A into the partition pipe 35.

That is, in the configuration of the above-described Patent Document 1, in order to seal gas and liquid which flows in a lower portion of a pipe outside of a single pipe unit, a metallic thin plate which covers the single pipe unit is connected to a pipe plate or the like which is connected to a body barrel at its lower portion. As a result, the operation of detaching the connected part is very difficult, and actually, a distillation section cannot be extracted from the body barrel. Even so, if an operator tries to extract the distillation section, a metallic thin plate (partition pipe) should be detached for each outside regular filler layer. As a result, a significant amount of labor for detaching the connected part between the metallic thin plate and the body barrel are required. However, in case of the internal heat exchanging type distillation column H of this Embodiment 2, only the pipe/filler unit A can be extracted and removed from the partition pipe 35. Therefore, it is not necessary to detach the partition pipe 35 fixed to the body barrel 21 from the body barrel 21, and it is possible to significantly reduce the number of man-hours for extraction or housing of the distillation section.

Additionally, in the internal heat exchanging type distillation column H of this Embodiment 2, the processing of spirally winding the wire rod 6 is performed as the close contact-promoting processing of the outside regular filler layer 3 to the outer peripheral surface of the pipe 1, and the pipe/filler unit A in which the inside belt-like bodies 12 and the outside belt-like bodies 13 are disposed in the inside regular filler layer 2 and the outside regular filler layer 3, respectively, is used. Thus, it is possible to obtain a internal heat exchanging type distillation column of a packed column type having excellent liquid dispersibility in the pipe inside 24 and the pipe outside 25, high internal heat exchanging efficiency, and an excellent energy-saving property and high distillation performance.

Additionally, the internal heat exchanging type distillation column (that is, internal heat exchanging type distillation column in which a plurality of pipes are provided inside the body barrel) H having a structure in which a plurality of single pipe units 40 is disposed at a predetermined pitch inside the body barrel 21 has been described as an example in this Embodiment 2. However, it is also possible to provide an internal heat exchanging type distillation column having a structure in which one single pipe unit is disposed inside a body barrel, that is, an internal heat exchanging type distillation column in which a single pipe is provided inside the body barrel, the inside of the pipe functions as a single pipe inside (enriching section), and the outside of the pipe functions as a single pipe outside (stripping section).

In addition, in the case of the internal heat exchanging type distillation column having a structure in which one single pipe unit is disposed inside the body barrel, it is possible to flexibly cope with an increase in throughput by using this internal heat exchanging type distillation column as one distillation unit and increase the number of distillation units if necessary.

The present invention is not limited to the above embodiments even in other points, and various applications and modifications can be made within the scope of the invention about the specific shape or structure of respective parts constituting the pipe/filler unit, the specific configuration of the inside and outside regular filler layers, the detailed structure of an internal heat exchanging type distillation column using the pipe/filler unit of the invention, and the like.

INDUSTRIAL APPLICABILITY

The pipe/filler unit of the present invention has a configuration in which a pipe, an inside regular filler layer disposed inside the pipe, and an outside regular filler layer disposed outside the pipe are provided integrally, and can be favorably used as a constructional member of a distillation section of an internal heat exchanging type distillation column of a packed column type which is adapted such that a pipe inside and a pipe outside of the single pipe or each pipe are isolated from each other inside the body barrel by connecting a single pipe or a plurality of pipes with a body barrel by both end pipe plates, a difference is caused in operating temperature by causing a difference in operation pressure between the pipe inside and the pipe outside, and heat is exchanged between low-pressure side and high-pressure side by transferring heat to the low-pressure side from the high-pressure side.

Additionally, in the internal heat exchanging type distillation column which is formed using the pipe/filler unit of the present invention, and configured such that the high-pressure side of the pipe inside functions as an enriching section and the low-pressure side of the pipe outside functions as a stripping section, it is possible to easily extract and clean the distillation section (that is, pipe/filler unit of the present invention), and it is possible to reliably maintain excellent distillation performance. Additionally, by using the pipe/filler unit of the present invention, it is possible to provide an internal heat exchanging type distillation column having excellent heat exchanging performance between the pipe inside and the pipe outside, and an excellent energy-saving property as a whole, and excellent distillation performance.

Accordingly, the pipe/filler unit and internal heat exchanging type distillation column of the present invention can be widely utilized in various fields, and particularly, can be suitably utilized as an internal heat exchanging type distillation column, with a liquid as an object to be distilled, which requires a distillation section to be cleaned periodically, and its constructional member.

What is claimed is:

1. A pipe/filler unit comprising:
a pipe where heat is exchanged between an inside and an outside of a pipe wall;
an inside regular filler layer disposed inside the pipe so as to abut an inner peripheral surface of the pipe, and
an outside regular filler layer disposed outside the pipe so as to surround the pipe and closely contact an outer peripheral surface of the pipe
wherein the outside regular filler layer is formed from a plurality of split tubular regular fillers which is split into a plurality of pieces in a peripheral direction, the plurality of split tubular regular fillers has a tubular structure disposed so as to cover an outer peripheral surface of the pipe, and the outside regular filler layer that is the tubular structure formed of the plurality of split tubular regular fillers is fastened by a fastening member so as to closely contact the outer peripheral surface of the pipe, and
the outer peripheral surface of the pipe is subjected to close contact-promoting processing for promoting the close contact feature between the outer peripheral surface and the outside regular filler layer by winding a wire rod whose diameter is 2 to 5 mm around the outer peripheral surface of the pipe.

2. The pipe/filler unit of claim 1, wherein a plurality of outside belt-like bodies which goes around the outside regular filler layer is disposed at a predetermined pitch in the axial direction of the pipe in an outer peripheral portion of the outside regular filler layer,
a plurality of cuts is formed at a pitch of 15 mm or less in a peripheral direction, in a side portion, which is located on an upper side when the pipe/filler unit is used, of both side portions of each outside belt-like body along its longitudinal direction, and
the side portion where the cuts of the outside belt-like body are formed is bent outward within a range of 40 to 90°.

3. The pipe/filler unit of claim 1, wherein a plurality of inside belt-like bodies which goes around the inside regular filler layer is disposed at a predetermined pitch in the axial direction of the pipe in an outer peripheral portion of the inside regular filler layer,
a plurality of cuts is formed at a pitch of 15 mm or less in a peripheral direction, in a side portion, which is located on an upper side when the pipe/filler unit is used, of both side portions of each inside belt-like body along its longitudinal direction, and
the side portion where the cuts of the inside belt-like body are formed is bent outward within a range of 40 to 90°.

4. A production method of an internal heat exchanging type distillation column configured such that
a pipe inside and a pipe outside of a single pipe are isolated from each other inside a body barrel by connecting the single pipe with the body barrel by both end pipe plates, regular filler layers are disposed in the pipe inside and the pipe outside, respectively, gas and liquid inlets and gas and liquid outlets are disposed in the pipe inside and the pipe outside, respectively,
a difference is caused in operating temperature by causing a difference in operation pressure between the pipe inside and the body barrel, and a high-pressure side on the side of the pipe inside functions as an enriching section and a low-pressure side on the side of the pipe outside functions as a stripping section by transferring heat to the low-pressure side on the side of the pipe outside from the high-pressure side on the side of the pipe inside, with a pipe wall of the single pipe as a heat transfer surface,
the method comprising the step of obtaining a structure in which the pipe/filler unit according to claim 1 is inserted into the body barrel, whereby the pipe constituting the pipe/filler unit is used as the single pipe of the internal heat exchanging type distillation column, the inside of the pipe is used as the pipe inside of the internal heat exchanging type distillation column, the outside of the pipe is used as the pipe outside of the internal heat exchanging type distillation column, the inside regular filler layer constituting the pipe/filler unit is used as the regular filler layer of the pipe inside of the internal heat exchanging type distillation column, and the outside regular filler layer constituting the pipe/filler unit is used as the regular filler layer of the pipe outside of the internal heat exchanging type distillation column.

5. A production method of an internal heat exchanging type distillation column having a structure in which
a plurality of single pipe units having a structure in which a pipe inside and a pipe outside of each pipe are isolated from each other inside a body barrel by connecting a plurality of pipes with the body barrel by both end pipe plates, the pipe inside and the pipe outside have gas and liquid inlets and gas and liquid outlets, respectively, regular filler layers are disposed inside each pipe constituting the plurality of pipes, the regular filler layer is disposed outside each pipe so as to surround an outer peripheral surface of each pipe, the regular filler layer disposed at the outer peripheral surface of each pipe is covered with a partition pipe made of a metallic thin plate for each pipe, is disposed at a predetermined pitch inside the body barrel, and which is configured such that a difference is caused in operating temperature by causing a difference in operation pressure between the pipe inside and the pipe outside, and a high-pressure side on a side of the pipe inside functions as an enriching section and a low-pressure side on a side of the pipe outside functions as a stripping section by transferring heat to the low-pressure side on the side of the pipe outside from the high-pressure side on the side of the pipe inside, with a pipe wall of each pipe constituting the plurality of pipes as a heat transfer surface, the method comprising the step of obtaining a structure in which the pipe/filler unit according to claim 1 is inserted into the partition pipe, whereby the pipe constituting the pipe/filler unit is used as each pipe constituting the plurality of pipes of the internal heat exchanging type distillation column, the inside of the pipe is used as the pipe inside of the internal heat exchanging type distillation column, the outside of the pipe is used as the pipe outside of the internal heat exchanging type distillation column, the inside regular filler layer constituting the pipe/filler unit is used as the regular filler layer of the pipe inside of the internal heat exchanging type distillation column, and the outside regular filler layer constituting the pipe/filler unit is used as the regular filler layer of the pipe outside of the internal heat exchanging type distillation column.

6. The production method of an internal heat exchanging type distillation column of claim 5,
wherein, with a plurality of partition pipes being disposed parallel to an axial direction of the body barrel inside the body barrel and the body barrel being raised vertically, the pipe/filler unit is inserted into each of the partition pipes from above.

7. A pipe/filler unit comprising:
a pipe where heat is exchanged between an inside and an outside of a pipe wall;
an inside regular filler layer disposed inside the pipe so as to abut an inner peripheral surface of the pipe, and
an outside regular filler layer disposed outside the pipe so as to surround the pipe and closely contact an outer peripheral surface of the pipe, wherein
the outside regular filler layer is formed from a plurality of split tubular regular fillers which is split into a plurality of pieces in a peripheral direction, the plurality of split tubular regular fillers has a tubular structure disposed so as to cover an outer peripheral surface of the pipe, and the outside regular filler layer that is the tubular structure formed of the plurality of split tubular regular fillers is fastened by a fastening member so as to closely contact the outer peripheral surface of the pipe, and
the outer peripheral surface of the pipe is subjected processing for promoting the close contact feature between the outer peripheral surface and the outside regular filler layer by spirally winding a wire rod around the outer peripheral surface of the pipe, an angle at which the wire rod is wound being 7 to 15° with respect to a plane orthogonal to the axial direction of the pipe.

8. The pipe/filler unit of claim 7,
wherein a plurality of outside belt-like bodies which goes around the outside regular filler layer is disposed at a predetermined pitch in the axial direction of the pipe in an outer peripheral portion of the outside regular filler layer,
a plurality of cuts is formed at a pitch of 15 mm or less in a peripheral direction, in a side portion, which is located on an upper side when the pipe/filler unit is used, of both side portions of each outside belt-like body along its longitudinal direction, and
the side portion where the cuts of the outside belt-like body are formed is bent outward within a range of 40 to 90°.

9. The pipe/filler unit of claim 7,
wherein a plurality of inside belt-like bodies which goes around the inside regular filler layer is disposed at a predetermined pitch in the axial direction of the pipe in an outer peripheral portion of the inside regular filler layer,
a plurality of cuts is formed at a pitch of 15 mm or less in a peripheral direction, in a side portion, which is located on an upper side when the pipe/filler unit is used, of both side portions of each inside belt-like body along its longitudinal direction, and
the side portion where the cuts of the inside belt-like body are formed is bent outward within a range of 40 to 90°.

10. A pipe/filler unit of comprising:
a pipe where heat is exchanged between an inside and an outside of a pipe wall;
an inside regular filler layer disposed inside the pipe so as to abut an inner peripheral surface of the pipe, and
an outside regular filler layer disposed outside the pipe so as to surround the pipe and closely contact an outer peripheral surface of the pipe, wherein
the outside regular filler layer is formed from a plurality of split tubular regular fillers which is split into a plurality of pieces in a peripheral direction, the plurality of split tubular regular fillers has a tubular structure disposed so as to cover an outer peripheral surface of the pipe, and the outside regular filler layer that is the tubular structure formed of the plurality of split tubular regular fillers is fastened by a fastening member so as to closely contact the outer peripheral surface of the pipe, and
the outer peripheral surface of the pipe is subjected to close contact-promoting processing for promoting the close contact feature between the outer peripheral surface and the outside regular filler layer by spirally winding a wire rod around the outer peripheral surface of the pipe, an interval from a center of the wire rod being 8 to 15 mm.

11. The pipe/filler unit of claim 10,
wherein a plurality of outside belt-like bodies which goes around the outside regular filler layer is disposed at a predetermined pitch in the axial direction of the pipe in an outer peripheral portion of the outside regular filler layer,
a plurality of cuts is formed at a pitch of 15 mm or less in a peripheral direction, in a side portion, which is located on an upper side when the pipe/filler unit is used, of both side portions of each outside belt-like body along its longitudinal direction, and
the side portion where the cuts of the outside belt-like body are formed is bent outward within a range of 40 to 90°.

12. The pipe/filler unit of claim 10,
wherein a plurality of inside belt-like bodies which goes around the inside regular filler layer is disposed at a predetermined pitch in the axial direction of the pipe in an outer peripheral portion of the inside regular filler layer,
a plurality of cuts is formed at a pitch of 15 mm or less in a peripheral direction, in a side portion, which is located on an upper side when the pipe/filler unit is used, of both side portions of each inside belt-like body along its longitudinal direction, and
the side portion where the cuts of the inside belt-like body are formed is bent outward within a range of 40 to 90°.

* * * * *